(12) United States Patent
Iijima et al.

(10) Patent No.: US 9,725,606 B2
(45) Date of Patent: Aug. 8, 2017

(54) AQUEOUS LIQUID COMPOSITION, AQUEOUS COATING, FUNCTIONAL COATING FILM, AND COMPOSITE MATERIAL

(71) Applicant: Dainichiseika Color & Chemicals Mfg. Co., Ltd., Tokyo (JP)

(72) Inventors: Yoshihiko Iijima, Tokyo (JP); Kozaburo Hayashi, Tokyo (JP); Yosuke Ichinomiya, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 237 days.

(21) Appl. No.: 13/956,894

(22) Filed: Aug. 1, 2013

(65) Prior Publication Data

US 2013/0316232 A1 Nov. 28, 2013

Related U.S. Application Data

(63) Continuation of application No. PCT/JP2012/052139, filed on Jan. 31, 2012.

(30) Foreign Application Priority Data

Feb. 23, 2011 (JP) ................ 2011-037627

(51) Int. Cl.
*H01M 4/00* (2006.01)
*C09D 5/24* (2006.01)
(Continued)

(52) U.S. Cl.
CPC .............. *C09D 5/24* (2013.01); *C08L 5/08* (2013.01); *C09D 105/08* (2013.01);
(Continued)

(58) Field of Classification Search
CPC ....................................................... H01M 4/00
See application file for complete search history.

(56) References Cited

U.S. PATENT DOCUMENTS

| 5,450,279 A | 9/1995 | Yoshida et al. |
| 2004/0072079 A1* | 4/2004 | Hashimoto et al. .......... 429/245 |

(Continued)

FOREIGN PATENT DOCUMENTS

| CN | 101609686 A | 12/2009 |
| CN | 101685862 | * 7/2011 |

(Continued)

OTHER PUBLICATIONS

Mitsuyoshi Fujiyama, "Chapter I, Causes of Mixing and Dispersion Failures for Conductive Fillers", *"New Mixing and Dispersion Technology for Conductive Fillers and Measures for Mixing and Dispersion Failures"* in Japanese, Technical Information Institute Co., Ltd., p. 20 (2004)—Abstract Only.

(Continued)

*Primary Examiner* — Jacob Marks
(74) *Attorney, Agent, or Firm* — Burr & Brown, PLLC

(57) ABSTRACT

An aqueous liquid composition contains a water-based medium containing water, chitosan and/or a chitosan derivative, and a polymeric acid, and has a pH of not higher than 4.5. The aqueous liquid composition contains low-cost materials having low environmental load, can retain adequate viscosity even when stored over a long term, and can form a functional coating film having excellent adhesiveness to a base material and superb durability, solvent resistance and waterproofness and capable of exhibiting various functions led by electrical conductivity and hydrophilicity.

21 Claims, 1 Drawing Sheet

(51) Int. Cl.

| | | |
|---|---|---|
| *C09D 135/00* | (2006.01) | |
| *C09D 105/08* | (2006.01) | |
| *C08L 5/08* | (2006.01) | |
| *H01G 11/22* | (2013.01) | |
| *H01M 4/66* | (2006.01) | |
| *B82Y 30/00* | (2011.01) | |

(52) U.S. Cl.
CPC ........... *C09D 135/00* (2013.01); *H01G 11/22* (2013.01); *H01M 4/663* (2013.01); *B82Y 30/00* (2013.01); *Y10T 428/2933* (2015.01); *Y10T 428/31634* (2015.04); *Y10T 428/31703* (2015.04); *Y10T 428/31982* (2015.04); *Y10T 442/20* (2015.04)

(56) References Cited

U.S. PATENT DOCUMENTS

| | | | |
|---|---|---|---|
| 2004/0092620 A1 | 5/2004 | Kobayashi et al. | |
| 2005/0014066 A1* | 1/2005 | Shimamune | 429/231.5 |
| 2007/0026313 A1* | 2/2007 | Sano | 429/217 |
| 2009/0257171 A1 | 10/2009 | Yamazaki et al. | |
| 2009/0325069 A1* | 12/2009 | Anada | C09J 123/147 429/217 |
| 2009/0325075 A1* | 12/2009 | Tsuchiya et al. | 429/232 |
| 2010/0273052 A1 | 10/2010 | Sakitani et al. | |
| 2011/0091771 A1 | 4/2011 | Sannan et al. | |
| 2012/0156562 A1 | 6/2012 | Kobayashi et al. | |
| 2013/0320271 A1 | 12/2013 | Yamazaki et al. | |

FOREIGN PATENT DOCUMENTS

| | | |
|---|---|---|
| EP | 2 048 726 A1 | 4/2009 |
| EP | 2 284 235 A1 | 2/2011 |
| EP | 2 471 869 A1 | 7/2012 |
| JP | 63-010456 A1 | 1/1988 |
| JP | 03-285262 A1 | 12/1991 |
| JP | 06-204085 A1 | 7/1994 |
| JP | 07-094374 A1 | 4/1995 |
| JP | 2002-035141 A1 | 2/2002 |
| JP | 2002-105241 A1 | 4/2002 |
| JP | 2005-317902 A1 | 11/2005 |
| JP | 2008-060060 A1 | 3/2008 |
| JP | 2009-238720 A1 | 10/2009 |
| JP | 2009-277660 AI | 11/2009 |
| JP | 2010-028007 A1 | 2/2010 |
| TW | 2010-28446 A | 8/2010 |
| WO | 2009/147989 A1 | 12/2009 |
| WO | 2011/024797 A1 | 3/2011 |

OTHER PUBLICATIONS

Hirokazu Tachibana, "*Preparation, Coating and Drying of Positive Electrode Slurry for Lithium Ion Secondary Cells, and Understanding of Electrode Operations*" in Japanese, Material Stage, Technical Information Institute Co., Ltd., 8(12), pp. 72-75 (2009)—Abstract Only.

Kiyokazu Joe, "*Technological Development of Dispersing Agents for Water Borne Coating Materials*" in Japanese, JETI, 44(10), pp. 110-112 (1996)—Abstract Only.

Hirohide Kamiya, "*Evaluation and Control of Agglomeration/Dispersion Behavior of Microparticles in Water System*" in Japanese, Material Stage, 2(1), pp. 54-60 (2002)—Abstract Only.

International Search Report dated Mar. 6, 2012 (with English translation).

Extended European Search Report (Application No. 12749610.7) dated Dec. 16, 2014.

Taiwanese Office Action, Taiwanese Application No. 20120104501, dated Dec. 15, 2015 (4 pages).

Chinese Office Action, Chinese Application No. 201280010336.5, dated Sep. 28, 2015 (5 pages).

\* cited by examiner

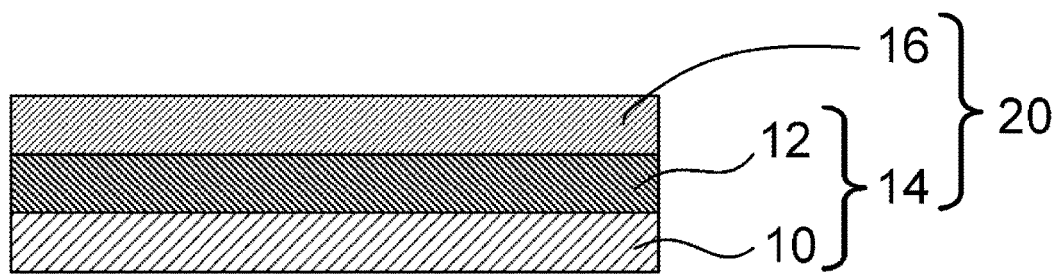

AQUEOUS LIQUID COMPOSITION, AQUEOUS COATING, FUNCTIONAL COATING FILM, AND COMPOSITE MATERIAL

BACKGROUND OF THE INVENTION

1. Field of the Invention

This invention relates to an aqueous liquid composition having low environmental load. More specifically, the present invention is concerned with an aqueous liquid composition and aqueous coating formulation, which can form functional coating films useful in various industrial fields, and also with a functional coating film formed with the aqueous coating formulation, and a composite material with the functional coating film and a base material integrated together.

2. Description of Related Art

In recent years, attempts have been made to use various functions of coating films formed by providing liquid compositions—such as solutions, slurries or pastes, which are equipped with various functions, respectively, and may hereinafter also be collectively referred to as "slurries"—as functional coating formulations and applying the functional coating formulations. Such attempts are under way in various fields such as paints, inks, coating agents, magnetic materials, ceramics, building materials, adhesives, liquid crystal color filters, pharmaceuticals, electronic materials, and electricity storage devices.

For example, a paste-form, conductive coating formulation composed of a conductive material, binder resin, curing agent, solvent and the like is used as a conductive adhesive, conductive paint, conductive ink or the like (Non-patent Document 1). A coated, magnetic recording medium such as an audio tape, video tape or flexible disk is manufactured by applying, onto a base film of a polyester or the like, a magnetic coating formulation with magnetic particles of submicron size evenly dispersed in a polymer solution. Further, electrodes for a lithium ion secondary cell are each prepared by mixing an active material, conductive material and binder to prepare a slurry, coating the slurry onto a collector foil, and then drying it (Non-patent Document 2).

To allow each of such various functional coating formulations as described above to fully exhibit its functionality, the coating film to be formed is required to be equipped with durability and high adhesiveness to a base material. In other words, it is essential conditions that the coating formulation is in a state appropriate for the exhibition of the functionality and can form a coating film having high adhesiveness to the base material and durability. As solvents (dispersion media) for such coating formulations, nonaqueous (organic solvent-based) solvents, which exhibit high compatibility with base materials and can be readily dried, are overwhelmingly advantageous, and as a matter of fact, have been used widely.

However, organic solvents are generally high in volatility. Accordingly, they are not only high in environmental load but also required to take genotoxicity into consideration, and therefore, still involve problems in safety and workability. In recent years, there is an increasing concern about the protection of environment and the prevention of health hazards in many industrial fields. There is, hence, an increasing demand toward VOC reductions, solventless coating and the like in connection with the use of organic solvents involving such problems as described above, leading to an outstanding requirement to switch to products that are friendly to the environment and people.

As products friendly to the environment and people, water-based products or products made from raw materials of biological origin are drawing attention. These products are expected to become part of solventless or post-petroleum products. Various problems, however, arise if water is used as a solvent in place of an organic solvent. For example, a water-based coating formulation involves a problem in that it is inferior in film-forming ability to an organic solvent-based coating formulation. Further, a slurry-form, water-based coating formulation with a filler contained therein is accompanied by a problem in that the filler tends to agglomerate in the slurry when it is in a charged state, and moreover, the filler is prone to settling due to a large difference in specific gravity between the solvent and the filler, thereby raising another problem in that its even dispersion is difficult. In addition, it is not easy to find raw materials of biological origin, which exhibit film-forming ability and dispersing ability and can replace conventional raw materials of petroleum origin.

Upon attempting the dispersion and stabilization of a filler in a water-based slurry, various methods may be contemplated including the use of a dispersant, the surface treatment, microencapsulation and ultrasonic treatment of the filler, and the introduction of polar groups into a polymer. Among these methods, the use of the dispersant is advantageous when the simplification of the production method and coating system and the cost matter are taken into account. As the dispersant for use in the water-based slurry, a polycarboxylate salt or phosphate amine salt used in the field of paints (Non-patent Document 3), a polyacrylamide as a high-molecular dispersant (Non-patent Document 4), or the like is conceivable. When a reduction in environmental load is taken into consideration, however, the dispersant may preferably be a substance of natural origin, which is friendly to the environment. A proposal has been made about the use of carboxymethylcellulose as a water-based dispersant upon production of each electrode for a nonaqueous electrolyte secondary cell (Patent Document 1). Concerning carboxymethylcellulose, however, there is still a room for an improvement in its dispersing effect. On the other hand, the use of a petroleum-based binder resin is needed to form a strong coating film. There is, accordingly, an outstanding desire for a utilization technology of a natural polymer that, although it is a substance of biological origin, can exhibit adhesiveness which is by no means inferior to that available from the use of a petroleum-based binder resin.

As an expected application of the water-based slurry, a coating formulation for electrode plates in electricity storage devices such as secondary cells or capacitors is considered. The demand for these electricity storage devices has been significantly growing in recent years. Each electrode plate is an electrode plate member, that includes unit members such as an electrode layer and collector integrated therein and gives significant effects on the performance of an electricity storage device. Proposals have been made to permit the production of an electrode plate in the form of a thinner film with larger area such that an electricity storage device can be provided with an extended charge-discharge cycle life and an increased energy density. For example, Patent Documents 2 and 3 disclose positive electrode plates, each of which is obtained by dispersing or dissolving a powder of a positive-electrode active material such as a metal oxide, sulfide or halogenide, a conductive material and a binder in an appropriate solvent to prepare a paste-form coating formulation, and then applying the coating formulation onto a surface of a collector formed of a foil of a metal such as aluminum to form a coating film layer.

A negative electrode plate for a cell or a polarizable electrode plate for a capacitor is obtained by mixing an active material such as a carbonaceous material with a solution of a binder in a suitable solvent to obtain a paste-form coating formulation and then applying the coating formulation onto a collector to form a coating film layer. The binder employed to prepare the coating formulation is required inter alfa to be electrochemically stable to a non-aqueous electrolyte and to be free from dissolution into the electrolyte for the cell or capacitor, to remain free from substantial swelling by the electrolyte, and further to be soluble in a certain solvent.

On the other hand, it is practiced to form a protective film on a surface of a metal material such as aluminum, as a base metal material of a collector, by coating a solution of one of various resins. The resulting protective film is excellent in the adhesiveness to the metal surface, but is accompanied by a problem in that its durability to an organic solvent is insufficient.

The coating film layer of the electrode plate for the cell or capacitor, said coating film layer having been obtained by applying the above-described paste-form coating formulation onto a collector, is accompanied by problems in that its adhesiveness to the collector and its flexibility are insufficient. In addition, the coating film layer has a high contact resistance to the collector, and may undergo peeling, flaking, cracking and/or the like upon assembly of the cell or capacitor or upon charging and discharging the same.

As described above, the conventional cell or capacitor is accompanied by the problems of the poor adhesion between the electrode layer and the collector (substrate) and the high internal resistance between the electrode layer and the collector. A variety of coating formulations have been proposed to solve these problems. By coating film layers formed with the various coating formulations so proposed, the problem of poor adhesiveness has been increasingly lessened. However, still higher resistance is produced between the electrode layer and the collector, so that none of these coating formulations have led to a solution to the problems yet. In recent years, there is al so a demand for a manufacturing method, which has paid due consideration to the environment, for the above-mentioned electricity storage devices and their related products. There is hence a demand for a coating formulation making use of components, which are low in environmental load.

PRIOR ART DOCUMENTS

Patent Documents

Patent Document 1: JP-A-2009-238720
Patent Document 2: JP-A-63-10456
Patent Document 3: JP-A-3-285262

Non-Patent Documents

Non-patent Document 1: FUJIYAMA, Mitsuyoshi: "Chapter I, Causes of Mixing and Dispersion Failures for Conductive Fillers", "New Mixing and Dispersion Technology for Conductive Fillers and Measures for Mixing and Dispersion Failures" in Japanese, Technical Information Institute Co., Ltd. p. 20 (2004)
Non-patent Document 2: TACHIBANA, Hirokazu: "Preparation, Coating and Drying of Positive Electrode Slurry for Lithium Ion Secondary Cells, and Understanding of Electrode Operations" in Japanese, Material Stage, Technical Information Institute Co., Ltd., 8(12), pp. 72-75 (2009)
Non-patent Document 3: JOE, Kiyokazu: "Technological Development of Dispersing Agents for Water Borne Coating Materials" in Japanese, JETI, 44(10), pp. 110-112 (1996)
Non-patent Document 4: KAMIYA, Hirohide: "Evaluation and Control of Agglomeration/Dispersion Behavior of Microparticles in Water System" in Japanese, Material Stage, 2(1), pp. 54-60 (2002)

SUMMARY OF THE INVENTION

Objects of the present invention are to provide an aqueous liquid composition, which contains low-cost materials having low environmental load, can retain adequate viscosity even when stored over a long term, and can form a functional coating film having excellent adhesiveness to a base material and superb durability, solvent resistance and waterproofness and capable of exhibiting various functions led by electrical conductivity and hydrophilicity, and also an aqueous coating formulation.

Further objects of the present invention are to provide a functional coating film having excellent adhesiveness to a base material and superb durability, solvent resistance and waterproofness and capable of exhibiting various functions led by electrical conductivity and hydrophilicity, and also a method for forming the functional coating film.

A still further object of the present invention is to provide a composite material with a functional coating film, which has superb durability, solvent resistance and waterproofness and is capable of exhibiting various functions led by electrical conductivity and hydrophilicity, adhered on a base material.

Even still further objects of the present invention are to provide an electrode plate member and electrode plate with a conductive coating film having excellent durability and solvent resistance and good conductivity and adhered on a collector, and an electricity storage device provided with the electrode plate and having a characteristic such as large discharge capacity or low internal resistance.

Means for Solving the Problem

The above-described objects can be achieved by the present invention to be described hereinafter. Described specifically, the present invention provides an aqueous liquid composition comprising a water-based medium containing water, at least one of chitosan and a chitosan derivative, and a polymeric acid, and having a pH of not higher than 4.5.

In the present invention, the aqueous liquid composition may preferably further comprise at least one resin selected from the group consisting of unmodified polyvinyl alcohol, modified polyvinyl alcohols, unmodified ethylene-vinyl alcohol copolymer, and modified ethylene-vinyl alcohol copolymers; and the modified polyvinyl alcohol may preferably be at least one modified polyvinyl alcohol selected from the group consisting of carboxyl-modified polyvinyl alcohols, carbonyl-modified polyvinyl alcohols, silanol-modified polyvinyl alcohols, amino-modified polyvinyl alcohols, cation-modified polyvinyl alcohols, sulfonic group-modified polyvinyl alcohols, and acetoacetyl-modified polyvinyl alcohols.

The aqueous liquid composition may preferably further comprise an organic acid with a proviso that the organic acid is other than phosphonobutane tricarboxylic acid; and may preferably further comprise at least one of a polyalkylene glycol and a polyalkylene oxide. The chitosan derivative may preferably be at least one chitosan derivative selected from the group consisting of hydroxyalkyl chitosans, carboxyalkyl chitosans, and carboxyacyl chitosans. The polymeric acid may preferably be at least one of a homopolymer of a carboxyl-containing vinyl monomer and a copolymer of a carboxyl-containing vinyl monomer and a carboxyl-free vinyl monomer; and the polymeric acid may preferably be at least one polymeric acid selected from the group consisting of polyacrylic acid, polyitaconic acid, and polymaleic acid.

The aqueous liquid composition may preferably further comprise a conductive material; and the conductive material may preferably be at least one conductive material selected from the group consisting of acetylene black, Ketjenblack, graphite, furnace black, monolayer and multilayer carbon nanofibers, and monolayer and multilayer carbon nanotubes.

According to the present invention, there is also provided an aqueous coating formulation comprising the above-described aqueous liquid composition. According to the present invention, there is also provided a functional coating film formed with the above-described aqueous coating formulation. The functional coating film may preferably have a surface resistivity of not higher than 3,000Ω/□ as measured following JIS K 7194.

According to the present invention, there is also provided a method for forming a functional coating film, which comprises a step of heating the above-described aqueous coating formulation to at least 80° C. According to the present invention, there is also provided a composite material provided with a base material and the above-described functional coating film arranged integrally on the base material. The base material may preferably be at least one base material selected from metals, glass, natural resins, synthetic resins, ceramics, wood, paper, fibers, non-woven fabrics, woven fabrics, and leather; and the base material may preferably be at least one base material selected from the group consisting of aluminum, copper, nickel, and stainless steel.

According to the present invention, there is also provided an electrode plate member provided with a collector and a conductive coating film arranged on a surface of the collector, wherein the conductive coating film has been formed by subjecting, to heat treatment, the above-mentioned aqueous liquid composition coated on the surface of the collector. The collector may preferably be a collector for a nonaqueous electrolyte secondary cell, electric double-layer capacitor or lithium ion capacitor.

According to the present invention, there is also provided an electrode plate provided with the above-mentioned electrode plate member and an active material layer arranged on a surface of the above-described conductive coating film. According to the present invention, there is also provided an electricity storage device provided with the above-described electrode plate. The electricity storage device may be preferred as a nonaqueous electrolyte secondary cell, electric double-layer capacitor or lithium ion capacitor.

Advantageous Effects of the Invention

The aqueous liquid composition and aqueous coating formulation according to the present invention contain low-cost materials having low environmental load, and can retain adequate viscosity even when stored over a long term. Further, they can form a functional coating film having excellent adhesiveness to a base material and superb durability, solvent resistance and waterproofness, and are capable of exhibiting functions such as electrical conductivity, hydrophilicity, antifouling properties, antimold and antibacterial activities, anti-odor properties and workability.

Even when a filler such as a conductive material is contained in the aqueous liquid composition and aqueous coating formulation according to the present invention, the filler is dispersed well and hardly undergoes setting-out. In addition, the aqueous liquid composition and aqueous coating formulation according to the present invention are expected to find utility in many fields such as cells, paints of electronic materials, inks, toners, rubbers and plastics, ceramics, magnetic materials, adhesives and liquid crystal color filters.

The functional coating film according to the present invention has excellent adhesiveness to the base material and superb durability, solvent resistance and waterproofness, and is capable of exhibiting functions such as electrical conductivity, hydrophilicity, antifouling properties, antimold and antibacterial activities, anti-odor properties and workability. Further, the functional coating film according to the present invention can be provided as a conductive coating film, which is high in the adhesiveness to a collector and electrode layer, is superb in electrolyte resistance, and is improved in the contact resistance with the collector. Furthermore, the electrode plate member and electrode plate according to the present invention are excellent in durability and solvent resistance, and moreover, include the conductive coating film having good conductivity and closely adhered on the collector. The use of the electrode plate member and electrode plate according to the present invention can, therefore, provide a high-performance, electricity storage device, such as a nonaqueous electrolyte secondary cell, electric double-layer capacitor or lithium ion capacitor, having a characteristic such as large discharge capacity or low internal resistance.

BRIEF DESCRIPTION OF THE DRAWINGS

FIG. 1 is a cross-sectional view illustrating the layer construction of one embodiment of the electrode plate member or electrode plate according to the present invention.

DETAILED DESCRIPTION OF THE INVENTION

The present invention will next be described in further detail based on modes for carrying out the invention. The aqueous liquid composition according to the present invention contains a water-based medium containing water, at least one of chitosan and a chitosan derivative, which may hereinafter be also referred to as "the chitosan", and a polymeric acid, and has a pH of not higher than 4.5. The inclusion of these components and the setting at the predetermined pH can inhibit the settling-out of a filler such as a conductive material, which may be contained further, and can also assure high hydrophilicity.

Owing to the inclusion of the chitosan and polymeric acid, both of which are equipped with binding ability and dispersing ability for a filler such as a conductive material, hydrophilicity and the like, the aqueous liquid composition according to the present invention is also excellent in environmental performance while retaining binding properties and dispersion properties for the filler and functionality such as hydrophilicity. Further, owing to the inclusion of an appropriate amount of water, preferably a water-based medium containing water and an organic solvent such as a water-soluble alcohol as a solvent or dispersion medium, the chitosan and polymeric acid are prevented from precipitation, and an adequate viscosity is retained. Hence, the aqueous liquid composition according to the present invention assures a pot life upon coating, prevents the settling-out of the filler, and realizes coatability and dispersion stability.

The term "aqueous liquid composition" as used in the present invention means one containing fine solid particles such as a filler dispersed at a high concentration in a water-based medium and having a slurry form or paste form.

Water-Based Medium

A water-based medium is contained in the aqueous liquid composition according to the present invention. This water-based medium is a component that functions as a solvent or a dispersion medium. The water-based medium can be water alone or a mixed solvent of water and an organic solvent. Water may preferably be distilled water, but depending on the application, may also be ordinary tap water.

The organic solvent may preferably be a solvent that is miscible with water. Specific examples of such an organic solvent include alcohols such as methyl alcohol, ethyl alcohol, n-propyl alcohol, isopropyl alcohol (IPA), n-butyl alcohol, s-butyl alcohol, isobutyl alcohol and t-butyl alcohol; esters such as methyl acetate, ethyl acetate, n-propyl acetate, isopropyl acetate, n-butyl acetate, isobutyl acetate, methoxybutyl acetate, cellosolve acetate, amyl acetate, methyl lactate, ethyl lactate and butyl lactate; ketones such as acetone, methyl ethyl ketone, methyl isobutyl ketone, diisobutyl ketone and cyclohexanone; amides such as N-methyl-2-pyrrolidone, N,N-dimethylacetamide and N,N-dimethylformamide; and sulfoxides such as dimethyl sulfoxide. Among these, the alcohols are preferred with IPA being more preferred. These organic solvents may be used either singly or as a combination of two or more.

When a mixed solvent of water and an organic solvent is used as the water-based medium, the proportion of the organic solvent contained in the mixed solvent may be preferably 1 to 70 mass %, with 5 to 60 mass % being more preferred. When a mixed solvent of IPA and water is used, for example, the proportion of IPA contained in the mixed solvent may be preferably 1 to 40 mass %, with 5 to 40 mass % being more preferred.

The Chitosan

The chitosan is contained in the aqueous liquid composition according to the present invention. Chitosan products available from the market can be used as they are. Among these chitosan products, chitosan derivatives are preferred from the standpoint of solubility in water and an organic solvent which may be added as needed. The chitosan derivatives include hydroxyalkyl chitosans, carboxyalkyl chitosans, carboxyacyl chitosans, succinyl chitosan, cationized chitosans, and the like. Of these, preferred is at least one chitosan derivative selected from the group consisting of hydroxyalkyl chitosans, carboxyalkyl chitosans, and carboxyacyl chitosans.

A description will hereinafter be made about the hydroxyalkyl chitosans. The hydroxyalkyl chitosans are natural polymers of biological origin, and do not add much load on the environment. Of these hydroxyalkyl chitosans, suited are hydroxyethyl chitosan, hydroxypropyl chitosan, hydroxybutyl chitosan, hydroxybutyl hydroxypropyl chitosan, glycerylated chitosan, and the like.

The hydroxyalkyl chitosans each have a structure that an alkylene oxide or oxiranemethanol has been added to amino groups in chitosan. Among these hydroxyalkyl chitosans, preferred are those produced by reacting chitosan and alkylene oxides and one produced by reacting chitosan with oxiranemethanol. For example, hydroxybutyl chitosan can be obtained by adding sodium hydroxide and butylene oxide to water-containing isopropyl alcohol in which chitosan has been stirred and dispersed, and then conducting stirring under heat. Further, glycerylated chitosan can be obtained by adding oxiranemethanol to water-containing isopropyl alcohol in which chitosan has been stirred and dispersed, and then conducting stirring under heat.

When a conductive material is contained as a filler in the aqueous liquid composition according to the present invention, a hydroxyalkyl chitosan having a hydroxyalkylation degree of 0.5 or greater but 4 or smaller can be suitably used from the standpoint of the dispersing ability for the conducive material. The term "hydroxyalkylation degree (no unit)" means the degree of addition of a corresponding alkylene oxide or oxiranemethanol to chitosan. Described specifically, preferred is one obtained by adding 0.5 mole or more but 4 moles or less of an alkylene oxide or oxiranemethanol per mole of a pyranose ring that makes up chitosan. To obtain such a hydroxyalkylation degree, it is desired to add and react 0.6 mole or more but 10 moles or less of the alkylene oxide or oxiranemethanol per mole of a pyranose ring that makes up chitosan. If the hydroxyalkylation degree of a hydroxyalkyl chitosan is 0.5 or smaller, the hydroxyalkyl chitosan may be insufficient in the dispersing ability for the filler and the stability of a slurry after dispersion. Even when the hydroxyalkylation degree exceeds 4, on the other hand, the dispersing ability for the filler may not change so that the setting of the hydroxyalkylation degree beyond 4 may be uneconomical.

The weight average molecular weight of such a hydroxyalkyl chitosan may be preferably 2,000 or higher but 350,000 or lower, more preferably 5,000 or higher but 250,000 or lower. If the weight average molecular weight of the hydroxyalkyl chitosan is lower than 2,000, the hydroxyalkyl chitosan may have insufficient dispersing ability for the conductive filler. If the weight average molecular weight of the hydroxyalkyl chitosan is higher than 350,000, on the other hand, the hydroxyalkyl chitosan tends to provide the resulting slurry with an increased viscosity, thereby possibly making it difficult to raise the solids concentration of the conductive filler.

The content of the chitosan in the aqueous liquid composition according to the present invention may be preferably 0.1 to 40 parts by mass, more preferably 0.5 to 20 parts by mass per 100 parts by mass of the aqueous liquid composition.

Polymeric Acid

In the aqueous liquid composition according to the present invention, a polymeric acid is contained. The inclusion of the polymeric acid provides the resulting coating film with improved adhesiveness to the base material and also with improved hydrophilic function. It is to be noted that the term "polymeric acid" as used herein means a polymer having plural acidic groups such as carboxyl groups or phosphoric groups, or a polymer formed by polymerization of plural carboxylic acid compounds and/or plural phosphoric acid compounds. The polymeric acid may be a homopolymer or a copolymer. Further, the acidic groups may be in a free acid form or in a salt form. Examples of the polymeric acid include phthalocyanine polycarboxylic acid, phytic acid, hexametaphosphoric acid, polyphosphoric acid, polyacrylic acid, polymethacrylic acid, polyitaconic acid, polymaleic acid, and their copolymers; and styrene-maleic acid copolymer, isobutylene-maleic acid copolymer, vinyl ether-maleic acid copolymer, pectic acid, poly glutamic acid, polymalic acid, polyaspartic acid, acrylic acid-maleic acid-vinyl alcohol copolymer, and the like. Of these, polyacrylic acid, polyitaconic acid and polymaleic acid can be used preferably.

The content of the polymeric acid contained in the aqueous liquid composition according to the present invention may be preferably 1 to 40 parts by mass, more preferably 1 to 20 parts by mass per 100 parts by mass of the aqueous liquid composition.

pH of Aqueous Liquid Composition

The pH of the aqueous liquid composition according to the present invention needs to be not higher than 4.5, with pH 3.0 or lower being preferred. Because the pH of the aqueous liquid composition is not higher than 4.5, the chitosan and polymeric acid as essential components can be dissolved so that a homogeneous composition can be provided. If the pH of the aqueous liquid composition is higher than 4.5, a polyion complex of the chitosan and polymeric acid precipitates, and no homogeneous composition can be obtained. It is to be noted that the pH of the aqueous liquid composition can be adjusted, for example, by adding an organic acid to be described subsequently herein or by adding an appropriate inorganic acid.

Polyvinyl Alcohol, Ethylene Vinyl Alcohol Copolymer

In the aqueous liquid composition according to the present invention, at least one of polyvinyl alcohol (PVA) and an ethylene vinyl alcohol copolymer (EVOH) may be further contained preferably. These PVA and EVOH may each be in a unmodified or modified form. Further, such PVA and EVOH, which may hereinafter be referred to as "PVA-based resin"), may be used either singly or as a combination of two or more.

The present inventors have found that a coating formulation, which is obtained by adding the PVA-based resin together with a polymeric acid to a water-based medium, can form on a surface of a metal material a coating film having excellent adhesiveness and solvent resistance. The present inventors have also found that, when a wet coating layer formed from this coating formulation is heated and dried to form a coating film layer, the polymeric acid acts as a crosslinking agent for the PVA-based resin. It has, therefore, been found that the resulting coating film is reduced in solubility and swellability to an organic solvent and electrolyte and exhibits excellent adhesiveness to the surface of the metal material or a collector and superb solvent resistance.

Unmodified PVA is a known resin available by saponifying polyvinyl acetate. In the present invention, the saponification degree of the unmodified PVA may be preferably 40% or higher, more preferably 70 to 100%. It is particularly preferred to use unmodified PVA having a polymerization degree of 300 to 5,000 and a saponification degree of 70 to 100%. Such unmodified PVA products are available from the market under trade names such as "KURARAY POVAL" (product of Kuraray Co., Ltd.), "GOHSENOL" (product of Nippon Synthetic Chemical Industry Co., Ltd.), "DENKA POVAL" (product of Denki Kagaku Kogyo Kabushiki Kaisha), and "J-POVAL" (product of Japan VAM & POVAL Co., Ltd.).

The modified PVA is one available by introducing functional groups other than hydroxyl groups or acetate groups in unmodified PVA. Illustrative of the modified PVA are carboxyl-modified PVA, carbonyl-modified PVA, silanol-modified PVA, amino-modified PVA, cation-modified PVAs, sulfonic group-modified PVA, acetoacetyl-modified PVA, and the like. Such modified PVAs are available from the market under trade names such as "GOHSERAN" (sulfonic group-modified PVA), "GOHSEFIMER K" (cation-modified PVA), "GOHSEFIMER Z" (acetoacetyl-modified PVA), and "GOHSENAL" (carboxyl-modified PVA) (all, products of Nippon Synthetic Chemical Industry Co., Ltd.); "D POLYMER" (carbonyl-modified PVA) and "A SERIES" (carboxyl-modified PVAs) (all, products of Japan VAM & POVAL Co., Ltd.); and "KURARAY C POLYMER" (cation-modified PVA) (product of Kuraray Co., Ltd.).

Unmodified EVOH is a known resin available by saponifying a copolymer of ethylene and vinyl acetate. In the present invention, the saponification degree of unmodified EVOH may be preferably 40% or higher, more preferably 70 to 100%. Among such unmodified EVOH, the use of unmodified EVOH having a copolymerized ethylene content of 60 mole % or lower is preferred. It is to be noted that the copolymerized ethylene content of unmodified EVOH may be more preferably 50 mole % or lower, still more preferably 40 mole % or lower. If the saponification degree of unmodified EVOH is lower than 40%, the adhesiveness to a collector may be lowered. The polymerization degree of unmodified EVOH may preferably be 300 to 5,000. Such unmodified EVOH products are available from the market under trade names such as "EVAL" (registered trademark, product of Kuraray Co., Ltd.).

The modified EVOH can be produced, for example, following the process described in JP-A-9-227633. As an alternative, it is also available directly from the market.

The content of the PVA-based resin contained in the aqueous liquid composition according to the present invention may be preferably 1 to 40 parts by mass, more preferably 1 to 20 parts by mass per 100 parts by mass of the aqueous liquid composition.

Organic Acid

In the aqueous liquid composition according to the present invention, an organic acid may be further contained preferably. "Phosphonobutane tricarboxylic acid" is not encompassed by the concept of "organic acid" in the present invention. The organic acid can lower the pH of the aqueous liquid composition, and therefore, can improve the water solubility of the components contained in the aqueous liquid composition. Further, when a coating film is formed with the aqueous liquid composition that contains the organic acid, the organic acid acts as a crosslinking agent for the chitosan and one or more resin components added optionally. The resulting coating film, therefore, exhibits excellent adhesiveness to a surface of a metal material such as aluminum and superb solvent resistance.

No particular limitation is imposed on the organic acid insofar as it contains one or more acidic groups such as carboxyl groups and is soluble to some extent in a water-based medium. Examples of the organic acid include formic acid, propionic acid, butyric acid, taurine, pyrrolidone carboxylic acid, citric acid, malic acid, tartaric acid, hydroxymalonic acid, malonic acid, succinic acid, adipic acid, sulfamic acid, maleic acid, benzoic acid, salicylic acid, aminobenzoic acid, phthalic acid, vitamin C, and the like. Of these, natural organic acids such as tartaric acid, malic acid and citric acid are preferred. Focusing an attention on a function as a crosslinking agent, it is preferred to use a divalent or higher-valent polybasic acid as an organic acid.

As the polybasic acid, a conventionally-known polybasic acid can be used. Specifically, usable examples include polybasic acids; acid anhydrides of polybasic acids; salts (ammonium salts and amine salts) of some or all of the carboxyl groups in polybasic acids; alkyl esters, amides, imides and amide-imides of some or all of the carboxyl groups in polybasic acids; derivatives obtained by modifying ones or more of the carboxyl groups in these compounds with N-hydroxysuccinimide, N-hydroxysulfosuccinimide or a derivative thereof; and the like. Preferred as derivatives of polybasic acids are compounds that form the polybasic acids when heated.

More specifically, it is preferred to use the below-described polybasic acids and their derivatives (for example, acid anhydrides).

<Dibasic acids> Oxalic acid, malonic acid, succinic acid, methylsuccinic acid, glutaric acid, methylglutaric acid, adipic acid, pimellic acid, suberic acid, azelaic acid, sebacic acid, maleic acid, methylmaleic acid, fumaric acid, methylfumaric acid, itaconic acid, muconic acid, citraconic acid, glutaconic acid, acetylenedicarboxylic acid, tartaric acid, malic acid, spiclisporic acid, glutamic acid, glutathione, aspartic acid, cystine, acetylcysteine, diglycolic acid, iminodiacetic acid, hydroxyethyliminodiacetic acid, thioglycolic acid, thionyldiglycolic acid, sulfonyldiglycolic acid, poly(oxyethylene)diglycolic acid (PEG acid), pyridinedicarboxylic acid, pyrazinedicarboxylic acid, epoxysuccinic acid, phthalic acid, isophthalic acid, terephthalic acid, tetrachlorophthalic acid, naphthalene dicarboxylic acid, tetrahydrophthalic acid, methyltetrahydrophthalic acid, cyclohexane dicarboxylic acid, diphenylsulfone dicarboxylic acid, and diphenylmethane dicarboxylic acid;

<Tribasic acids> Citric acid, 1,2,3-propanetricarboxylic acid, 1,2,4-butanetricarboxylic acid, 2-phosphono-1,2,4-butanetricarboxylic acid, trimellitic acid, and 1,2,4-cyclohexanetricarboxylic acid;

<Tetrabasic acids> Ethylenediaminetetraacetic acid, 1,2,3,4-butanetetracarboxylic acid, pyromellitic acid, 1,2,4,5-cyclohexanetetracarboxylic acid, and 1,4,5,8-naphthalenetetracarboxylic acid; and <Hexabasic acids> 1,2,3,4,5,6-Cyclohexanehexacarboxylic acid.

It is to be noted that other polybasic acids to be described below may also be used in combination. Illustrative are tribasic acids such as isocitric acid, aconitic acid, nitrilotriacetic acid, hydroxyethylethylenediaminetriacetic acid, carboxyethylthiosuccinic acid, and trimesic acid; monocyclic tetracarboxylic acids such as ethylenediamine-N,N'-succinic acid, 1,4,5,8-naphthalenetetracarboxylic acid, pentenetetracarboxylic acid, hexenetetracarboxylic acid, glutamate diacetic acid, maleated methylcyclohexenetetracarboxylic acid, furantetracarboxylic acid, benzophenonetetracarboxylic acid, phthalocyaninetetracarboxylic acid, 1,2,3,4-cyclobutanetetracarboxylic acid, and cyclopentanetetracarboxylic acid; tetrabasic acids, e.g., polycyclic tetracarboxylic acids such as bicyclo[2,2,1]heptane-2,3,5,6-tetracarboxylic acid and bicyclo[2,2,2]octane-2,3,5,6-tetracarboxylic acid; pentabasic acids such as diethylenetriamine pentaacetic acid; and the like.

The content of one or more organic acids contained in the aqueous liquid composition according to the present invention may be preferably 0.01 to 40 parts by mass, more preferably 0.01 to 20 parts by mass per 100 parts by mass of the aqueous liquid composition.

Polyalkylene Glycol, Polyalkylene Oxide

In the aqueous liquid composition according to the present invention, at least one of a polyalkylene glycol and polyalkylene oxide may be contained preferably. The polyalkylene glycol is a nonionic compound available from ring-opening polymerization of an alkylene oxide such as ethylene oxide, propylene oxide or butylene oxide. The polyalkylene oxide, on the other hand, is similar to the polyalkylene glycol, but is a high molecular weight type, nonionic compound having a higher polymerization degree. Owing to the inclusion of at least one of the polyalkylene glycol and polyalkylene oxide, the resulting coating film is provided with still higher flexibility and hydrophilicity.

As the polyalkylene glycol, polyethylene glycol, polypropylene glycol or polybutylene glycol is preferred. As the polyalkylene oxide, on the other hand, polyethylene oxide, polypropylene oxide, polytetramethylene oxide, a random or block copolymer of polyethylene oxide and polypropylene oxide, or the like is preferred. They are available from the market under trade names such as "PEO" (product of Sumitomo Seika Chemicals Co., Ltd.) and "ALKOX" (product of Meisei Chemical Works, Ltd.).

The total content of the polyalkylene glycol and polyalkylene oxide in the aqueous liquid composition according to the present invention may be preferably 0.1 to 40 parts by mass, more preferably 0.5 to 20 parts by mass per 100 parts by mass of the aqueous liquid composition.

Conductive Material

In the aqueous liquid composition according to the present invention, a conductive material may be contained preferably. The inclusion of the conductive material makes it possible to form a coating film with improved electrical contact properties. Coating films formed as described above are suited as coating films for collectors to be used in an electricity storage device such as a lithium secondary cell or capacitor. Specifically, a coating film having good conductivity can be formed, thereby making it possible to provide an electrode layer with reduced internal resistance and also with higher capacity density.

The conductive material may preferably be at least one conductive material selected from the group consisting of acetylene black, Ketjenblack, graphite, furnace black, monolayer and multilayer carbon nanofibers, and monolayer and multilayer carbon nanotubes.

The content of the conductive material in the aqueous liquid composition according to the present invention may be preferably 0.1 to 30 parts by mass, more preferably 1 to 20 parts by mass per 100 parts by mass of the aqueous liquid composition.

Applications of Aqueous Liquid Composition

By selecting and including the appropriate chitosan and polymeric acid, the aqueous liquid composition according to the present invention can be used as an aqueous coating formulation having low environmental load and excellent functionality. Described specifically, the aqueous liquid composition according to the present invention can be expected to find utility in various fields such as paints, inks, magnetic materials, ceramics, electricity storage devices, adhesives, electronic materials, liquid crystal color filters, pharmaceuticals, cosmetics and fragrances. By including a conductive material such as carbon black, for example, the aqueous liquid composition can be used as a conductive coating formulation for forming a conductive coating film on a surface of a collector for an electricity storage device such as a lithium ion secondary cell or capacitor.

Aqueous Coating Formulation

The aqueous coating formulation according to the present invention contains the above-mentioned aqueous liquid composition. It is to be noted that the above-mentioned aqueous liquid composition alone may also be used, as it is, as a coating formulation. As an alternative, the aqueous liquid composition may also be used after diluting it with a water-based medium to have a suitable dilution rate commensurate with the application.

When the aqueous coating formulation according to the present invention is applied onto a surface of a base material such as a metal material and the resulting wet coating layer is heated and dried, the polymeric acid acts as a crosslinking agent for the chitosan to provide the resulting coating film with outstanding adhesiveness to the surface of the base material and also with solvent resistance and waterproofness.

The contents of the respective components in the aqueous coating formulation may be set as will be described below under the assumption that the whole aqueous coating formulation amounts to 100 parts by mass. The chitosan may amount to preferably 0.1 to 40 parts by mass, more preferably 0.5 to 20 parts by mass. The polymeric acid may amount to preferably 1 to 40 parts by mass, more preferably 1 to 20 parts by mass. The PVA-based resin may amount to preferably 1 to 40 parts by mass, more preferably 1 to 20 parts by mass. The organic acid may amount to preferably 0.01 to 40 parts by mass, more preferably 0.01 to 20 parts by mass. The total of the polyalkylene glycol and polyalkylene oxide may amount to preferably 0.02 to 40 parts by mass, more preferably 0.1 to 20 parts by mass. The conductive material may amount to preferably 0.1 to 30 parts by mass, more preferably 1 to 20 parts by mass. It is to be noted that the solids content of the aqueous coating formulation may preferably be 1 to 40 mass %.

If the content of the chitosan is lower than 0.1 parts by mass, the resulting coating film may be provided with insufficient strength and adhesiveness, and the components that make up the coating film tend to fall off. If the content of the chitosan is higher than 40 parts by mass, on the other hand, there is a tendency that a homogeneous solution is hardly obtainable. If the content of the polymeric acid is less than 1 parts by mass, the degree of crosslinking may become insufficient, and therefore, the resulting coating film tends to be provided with low crosslink density and also with insufficient adhesiveness to the base material and insufficient insolubility and non-swellability to organic solvents. If the content of the polymeric acid is higher than 40 parts by mass, on the other hand, the resulting coating film tends to be provided with lower flexibility and may be disadvantageous in cost. If the content of the conductive material is lower than 0.1 parts by mass, the resulting coating film may be provided with insufficient conductivity. If the content of the conductive material is higher than 30 parts by mass, on the other hand, other components may become insufficient and the resulting coating film may be provided with lower performance.

When forming a conductive coating film, it is preferred to contain 1 to 10 parts by mass of the chitosan, 1 to 20 parts by mass of the polymeric acid, 1 to 10 parts by mass of the PVA-based resin, 1 to 15 parts by mass of the organic acid, 0.1 to 10 parts by mass in total of the polyalkylene glycol and polyalkylene oxide, and 1 to 15 parts by mass of the conductive material when the whole aqueous coating formulation is assumed to amount to 100 parts by mass.

In the aqueous coating formulation according to the present invention, a resin other than the chitosan or PVA-based resin, said resin (said other resin) being capable of functioning as a binder, may be further contained preferably. The inclusion of the other resin can form a coating film provided with excellent physical strength, durability and abrasion resistance, and further improved adhesiveness to the base material. Examples of the other resin include polyvinyl acetal, fluorine-containing high-molecular materials, cellulose-based high-molecular materials, starch-based high-molecular materials, styrene-based polymers, polyamides, polyimides, polyamide-imides, and the like. As the other resin, one available from the market may be used as it is, but the use of one converted to a derivative is preferred in view of the solubility or the like in a solvent or dispersion medium.

The content of the other resin contained in the aqueous coating formulation according to the present invention may be preferably 10 to 2,000 parts by mass, more preferably 100 to 1,000 parts by mass per 100 parts by mass of the chitosan. In terms of solids content, the content of the other resin may be preferably 1 to 40 mass %, more preferably 5 to 20 mass %. If the content of the other resin is lower than 1 mass %, the resulting coating film tends to be provided with insufficient strength and insufficient adhesiveness to the base material so that the components may fall off from the coating film. If the content of the other resin exceeds 40 mass %, on the other hand, it may be difficult to obtain a homogeneous coating formulation. When a conductive material is contained, a content of the other resin higher than 40 mass % has a tendency that the conductive material may be covered under the other resin and the function of the conductive material may no longer be exhibited fully.

When the other resin is contained, the content of the polymeric acid contained in the aqueous coating formulation may be preferably 1 to 150 parts by mass, more preferably 2 to 100 parts by mass per 100 parts by mass of the other resin. If the content of the polymeric acid is lower than 1 parts by mass, the resulting coating film may be provided with insufficient adhesiveness to the base material. When employed in a cell, a content of the polymeric acid lower than 1 parts by mass may result in a crosslinked resin insufficient in the insolubility, non-swellability, electrochemical stability and the like to an electrolyte. A content of the polymeric acid higher than 150 parts by mass, on the other hand, may provide the resulting coating film with reduced flexibility, and moreover, may result in an economic disadvantage.

It is also preferred to use, as the other resin, a homopolymer (polyvinylpyrrolidone) formed of constituent units derived from vinylpyrrolidone or a copolymer (polyvinylpyrrolidone copolymer) containing constituent units derived from vinylpyrrolidone. The inclusion of such polyvinylpyrrolidone or polyvinylpyrrolidone copolymer, which may hereinafter be referred to as "the vinylpyrrolidone-based polymer", in the aqueous coating formulation leads to a further improvement in the dispersibility for a conductive material, thereby making it possible to form a coating film in a still better form.

Polyvinylpyrrolidone is a nonionic polymer having high safety. Polyvinylpyrrolidone is available from the market under trade names such as "POLYVINYLPYRROLIDONE K-30", "POLYVINYLPYRROLIDONE K-85" and "POLYVINYLPYRROLIDONE K-90" (all, products of Nippon Shokubai Co., Ltd.) and "PITZCOL" (product of Dai-ichi Kogyo Seiyaku Co., Ltd.).

No particular limitation is imposed on the polyvinylpyrrolidone copolymer insofar as it is a copolymer of vinylpyrrolidone and a vinyl-containing monomer. Specific examples of the vinyl-containing monomer include acrylic acid, methacrylic acid, alkyl acrylates such as methyl acrylate and ethyl acrylate, alkyl methacrylates such as methyl methacrylate and ethyl methacrylate, aminoalkyl acrylates such as diethylaminoethyl acrylate, aminoalkyl methacrylates such as diethylaminoethyl methacrylate, monoesters of acrylic acid and glycols such as hydroxyethyl acrylate, monoesters of methacrylic acid and glycols such as hydroxyethyl methacrylate, alkali metal salts of acrylic acid, alkali metal salts of methacrylic acid, the ammonium salt of acrylic acid, the ammonium salt of methacrylic acid, the quaternary ammonium derivatives of aminoalkyl acrylates, the quaternary ammonium derivatives of aminoalkyl methacrylates, vinyl methyl ether, vinyl ethyl ether, vinyl acetate, N-vinylimidazole, N-vinylacetamide, N-vinylformamide, N-vinylcaprolactam, N-vinylcarbazole, acrylamide, methacrylamide, N-alkylacrylamides, N-methylolacrylamide, and the like.

The polyvinylpyrrolidone copolymers are available from the market under trade names such as "RUBISCOL VAP" (vinylpyrrolidone/vinyl acetate/vinyl propionate copolymer, product of BASF SE), "RUBISETCAP" (vinyl acetate/crotonic acid/vinylpyrrolidone copolymer, product of BASF SE), "RUBIFLEX" (vinylpyrrolidone/acrylate copolymer, product of BASF SE), "GAFQUAT" (quaternized product of vinylpyrrolidone/dimethylaminoethyl methacrylate, product of International Specialty Products, Inc.), "RUBICOTE" (methylvinylimidazolium chloride/vinylpyrrolidone copolymer, product of BASF SE), "RUBISCOL VA" (vinylpyrrolidone/vinyl acetate copolymer, product of BASF SE), "COPOLYMER 937" (vinylpyrrolidone/dimethylaminoethyl methacrylate copolymer, product of International Specialty Products, Inc.), and "COPOLYMER VC713" (vinylcaprolactam/vinylpyrrolidone/dimethylaminoethyl methacrylate copolymer, product of International Specialty Products, Inc.).

The content of the vinylpyrrolidone-based polymer contained in the aqueous coating formulation may preferably be from 0.1 to 20 parts by mass when the aqueous coating formulation is assumed to amount to 100 parts by mass. A content of the vinylpyrrolidone-based polymer lower than 0.1 parts by mass is so little that the advantageous effects available from its addition can be hardly brought about. A content of the vinylpyrrolidone-based polymer higher than 20 parts by mass, on the other hand, tends to provide the resulting coating film with lowered oxidation resistance.

In the coating formulation according to the present invention, a crosslinking agent (other than the above-mentioned organic acid) may also be contained preferably. Examples of the crosslinking agent include epoxy compounds such as ethylene glycol diglycidyl ether, polyethylene glycol diglycidyl ether and glycerol polyglycidyl ether; isocyanate compounds such as toluoylene diisocyanate, xylylene diisocyanate, hexamethylene diisocyanate and phenyl diisocyanate; blocked isocyanate compounds formed by blocking such isocyanate compounds with blocking agents such as phenols, alcohols, active methylene compounds, mercaptans, acid-amides, imides, amines, imidazoles, ureas, carbamic acids, imines, oximes or sulfites; aldehyde compounds such as glyoxal, glutaraldehyde, and dialdehyde starch; (meth) acrylate compounds such as polyethylene glycol diacrylate, polyethylene glycol dimethacrylate and hexanediol diacrylate; methylol compounds such as methylolmelamine and dimethylol urea; organic acid metal salts such as zirconyl acetate, zirconyl carbonate and titanium lactate; metal alkoxide compounds such as aluminum trimethoxide, aluminum tributoxide, titanium tetraethoxide, titanium tetrabutoxide, zirconium tetrabutoxide, aluminum dipropoxide acethylacetonate, titanium dimethoxide bis(acetylacetonate) and titanium dibutoxide bis(ethylacetoacetate); silane coupling agents such as vinylmethoxysilane, vinylethoxysilane, 3-glycidoxypropyltrimethoxysilane, 3-glycidoxypropyltriethoxysilane, 3-methacryloxypropyltrimethoxysilane, 3-aminopropyltrimethoxysilane, 3-aminopropyltriethoxysilane, 3-isocyanatopropyltriethoxysilane and imidazolesilane; silane compounds such as methyltrimethoxysilane, tetraethoxysilane and methyltriethoxysilane; carbodiimide compounds; and the like. The content of one or more of these crosslinking agents may be set preferably at 0.01 to 200 mass % based on the sum of the chitosan and the resin component or components other than the chitosan.

When the aqueous coating formulation is a solution that does not contain a filler or the like, the aqueous coating formulation can be prepared by adding the chitosan, polymeric acid, PVA-based resin, organic acid, polyalkylene glycol (polyalkylene oxide), vinylpyrrolidone-based polymer and the like to the water-based medium and adjusting the pH to 4.5 or lower. No particular limitation is imposed on the order in which the individual components are added to the water-based medium (solvent). Stirring may be conducted at room temperature or, if necessary, may be conducted under heating.

In the case of the aqueous coating formulation with the conductive material dispersed therein, on the other hand, the aqueous coating formulation can be prepared by adding the chitosan, polymeric acid, conductive material, PVA-based resin, organic acid, polyalkylene glycol (polyalkylene oxide), vinylpyrrolidone-based polymer and the like to the water-based medium (dispersion medium) such that they are proportioned as described above, and subsequent to an adjustment to pH 4.5 or lower, mixing and dispersing them in a conventionally-known mixer. As the mixer, a ball mill, sand mill, pigment disperser, mix-muller, ultrasonic disperser, homogenizer, planetary mixer, Hobart mixer, or the like can be used. Also preferred is a method that firstly mixes the conductive material in a mixer, adds the chitosan, polymeric acid and other optional components, and then mixes them until homogeneous. The adoption of such a method makes it possible to readily prepare a homogeneous aqueous coating formulation.

Functional Coating Film

The functional coating film according to the present invention is formed by heating and drying a wet coating layer formed by applying the above-mentioned aqueous coating formulation onto a surface of a material to be coated (base material). No particular limitation is imposed on the amount of the aqueous coating formulation to be applied, but the aqueous coating formulation may be applied in such an amount that the functional coating film to be formed will have a thickness of generally 0.05 to 100 μm, preferably 0.1 to 10 more preferably 0.1 to 5 μm, still more preferably 0.1 to 2 μm. As the base material, a metal such as aluminum or copper, glass, a natural resin, a synthetic resin, ceramics, wood, paper, fibers, a woven fabric, a nonwoven fabric, a leather or the like can be mentioned. Of these, a collector for an electricity storage device, such as an aluminum foil or copper foil, is preferred.

The aqueous coating formulation is applied onto the surface of the base material by one of various coating methods such as gravure coating, gravure reverse coating, roll coating, Meyer bar coating, blade coating, knife coating, air knife coating, comma coating, slot die coating, slide die coating, dip coating, extrusion coating, spray coating and brush coating. Subsequently, the thus-applied coating formulation is heated and dried to form a functional coating film. If the thickness of the functional coating film is smaller than 0.1 μm, it may be difficult to evenly apply the aqueous coating formulation. A thickness greater than 10 μm, on the other hand, may provide the resulting functional coating film with reduced flexibility.

The drying and heating may be conducted preferably at 80° C. or higher for 1 second or longer, more preferably at 80° C. or higher but 250° C. or lower for 1 second or longer but 60 minutes or shorter. Insofar as these conditions are met, the polymers in the coating formulation, such as the chitosan, can be fully crosslinked to provide the resulting functional coating film with improved adhesiveness to the base material and also with improved electrochemical stability. A heat treatment condition of lower than 80° C. or shorter than 1 second may provide the resulting functional coating film with reduced adhesiveness and electrochemical stability.

Conductive Coating Film, Electrode Plate Member, Electrode Plate, and Electricity Storage Device When a conductive material is contained, the aqueous liquid composition and aqueous coating formulation according to the present invention are suited as materials for forming a conductive coating film that makes up an electrode plate for an electricity storage device such as a secondary cell or capacitor. An electrode plate member 14, which is provided with a collector 10 and a conductive coating film 12 arranged on a surface of the collector 10 as illustrated in FIG. 1, can be obtained by heating and drying the aqueous liquid composition or aqueous coating formulation applied on the surface of the collector 10. The thickness of the conductive coating film 12 may be generally 0.1 to 10 µm, preferably 0.1 to 5 µm, more preferably 0.1 to 2 µm. By forming, on the thus-formed conductive coating film 12, an active material layer 16 such as a positive electrode layer for a cell, a negative electrode layer for the cell, a positive electrode layer for a capacitor, a negative electrode layer for the capacitor, or a polarizable electrode layer, an electrode plate 20 for an electricity storage device can be fabricated with small resistance between the electrode layer and the collector and low environmental load as illustrated in FIG. 1.

Further, the use of electrode plates fabricated as described above makes it possible to obtain an electricity storage device such as a nonaqueous electrolyte secondary cell, electric double-layer capacitor or lithium ion capacitor. This electricity storage device is provided with electrode plate members having conductive coating films arranged on surfaces of collectors, and therefore, has an excellent characteristic such as large discharge capacity or low internal resistance.

The surface resistivity of the conductive coating film may be preferably 3,000Ω/□ or lower, more preferably 2,000Ω/□ or lower. If the surface resistivity is higher than 3,000Ω/□, the internal resistance increases, thereby making it difficult to obtain a high-efficiency and long-life, cell or capacitor.

The surface resistivity of the conductive coating film is measured by a method to be described hereinafter. After an aqueous coating formulation is applied onto a glass plate, the coating formulation is dried at 200° C. for 1 minute to form a conductive coating film of 4 µm dry film thickness. Following JIS K 7194, the surface resistivity is measured by the four-point probe method. The measurement of surface resistivity by the four-point probe method can be conducted under conditions of 25° C. and 60% relative humidity by using a "LORESTA-GP MCP-T610" (manufactured by Mitsubishi Chemical Analytech Co., Ltd.).

Hydrophilic Coating Film

The aqueous liquid composition and aqueous coating formulation according to the present invention are suited as materials for forming a hydrophilic coating film on a surface of a base material such as glass. By forming the hydrophilic coating film, antifogging properties are imparted. The thickness of the hydrophilic coating film may be generally 0.1 to 10 µm, preferably 0.1 to 5 µm, more preferably 0.1 to 2 µm.

The contact angle (θ) between the hydrophilic coating film and water may preferably be 40° or smaller. The contact angle (θ) between the hydrophilic coating film and water is measured by a method to be described hereinafter. After an aqueous coating formulation is applied onto a base material, the coating formulation is dried at 200° C. for 10 seconds to form a hydrophilic coating film of 0.7 µm dry film thickness. Following JIS K 2396, the contact angle of water to the hydrophilic coating film is measured by the droplet method. The measurement of the contact angle by the droplet method can be conducted under conditions of 25° C. and 60% relative humidity by using a contact angle meter "DropMaster 100" (manufactured by Kyowa Interface Science Co., Ltd.).

Composite Material

The composite material according to the present invention is provided with a base material and the above-mentioned functional coating film integrally arranged on the base material. The composite material according to the present invention is a material excellent in hydrophilicity, conductivity, antibacterial activities, anti-odor properties, texture, antifogging properties, durability, dyeability, waterproofness, antifouling properties, and the like. The composite material according to the present invention can be produced by heating and drying a coating film formed by applying the above-mentioned aqueous liquid composition or aqueous coating formulation onto the base material.

As the base material, a metal, glass, a natural resin, a synthetic resin, ceramics, wood, paper, a nonwoven fabric, a woven fabric, a leather or the like can be mentioned. The use of a metal, such as aluminum, copper, nickel or stainless steel, as a base material can provide a composite material useful as a collector for an electricity storage device.

EXAMPLES

The present invention will next be described more specifically based on examples. It is to be noted that all designations of "parts" or "%" in the following description are on a mass basis.

Preparation of Various Aqueous Liquid Compositions

The formulas of various aqueous liquid compositions are shown in Tables 1-1 and 1-2. It is to be noted that the following abbreviations will be used: HPC for hydroxypropyl chitosan, HBC for hydroxybutyl chitosan, GLYC for glycerylated chitosan, BTC for 1,2,3,4-butanetetracarboxylic acid, IPA for isopropyl alcohol, and NMP for N-methyl-2-pyrrolidone.

Sample 1-1

Chitosan (deacetylation degree: 85%, weight average molecular weight: 70,000) (2 parts) and a 50% aqueous solution of polymaleic acid ("Dequest P9000", product of Thermophos International B.V.,) (20 parts) were added to deionized water (78 parts), and the resulting mixture was stirred into a solution at room temperature for 4 hours, so that an aqueous liquid composition (100 parts) was prepared.

Samples 1-2 to 1-16

Aqueous liquid compositions were prepared as in Sample 1-1 described above except that the corresponding formulas shown in Tables 1-1 and 1-2 were employed. It is to be noted that in Tables 1-1 and 1-2, "Component A", "Component B" and "Component C" mean the chitosan, the polymeric acid and the PVA-based resin, respectively.

Sample 1-17

After chitosan (deacetylation degree: 85%, weight average molecular weight: 70,000) (5 parts) was dispersed in deionized water (88.5 parts), acetic acid (1.5 parts) was added and the resulting mixture was stirred at room temperature for 4 hours. When an aqueous solution of a polyacrylic acid ("JURYMER AC-10H", product of Toagosei Co., Ltd.; solids content: 20%, MW: 150,000) (5 parts) was added, the polymer components separated and precipitated, thereby failing to obtain a coatable aqueous liquid composition.

Sample 1-18

An aqueous solution of a polyacrylic acid ("JURYMER AC-10L", product of Toagosei Co., Ltd.; solids content: 40%, MW: 25,000) (25 parts) was added to deionized water (75 parts), and the resulting mixture was stirred at room temperature to prepare a 10% aqueous solution of the polyacrylic acid.

TABLE 1-1

|  | Component A | | Component B | | Component C | |
| --- | --- | --- | --- | --- | --- | --- |
|  | Kind | Parts | Kind | Parts | Kind | Parts |
| Sample 1-1 | Chitosan | 2 | Polymaleic acid | 10 | | |
| Sample 1-2 | HPC | 5 | POLYACRYLIC ACID A | 10 | | |
| Sample 1-3 | HBC | 5 | Polyitaconic acid | 10 | | |
| Sample 1-4 | GLYC | 10 | POLYACRYLIC ACID A | 20 | | |
| Sample 1-5 | Chitosan | 5 | POLYACRYLIC ACID B | 10 | | |
| Sample 1-6 | Chitosan | 4 | POLYACRYLIC ACID A | 4 | | |
| Sample 1-7 | Chitosan | 4 | POLYACRYLIC ACID A | 4 | | |
| Sample 1-8 | GLYC | 5 | POLYACRYLIC ACID B | 5 | | |
| Sample 1-9 | Chitosan | 2 | POLYACRYLIC ACID A | 5 | PVA100 | 5 |
| Sample 1-10 | Chitosan | 1 | POLYACRYLIC ACID A | 8 | PVA100 | 5 |
| Sample 1-11 | Chitosan | 2 | POLYACRYLIC ACID A | 4 | PVA100 | 4 |
| Sample 1-12 | Chitosan | 0.5 | POLYACRYLIC ACID A | 4 | PVA80 | 4 |
| Sample 1-13 | Chitosan | 1 | POLYACRYLIC ACID A | 4 | Sulfonic group-modified PVA | 4 |
| Sample 1-14 | GLYC | 2 | POLYACRYLIC ACID A | 5 | EVOH | 1 |
| Sample 1-15 | Chitosan | 2 | POLYACRYLIC ACID A | 5 | PVA100 | 5 |
| Sample 1-16 | Chitosan | 2 | POLYACRYLIC ACID A | 5 | PVA100 | 5 |
| Sample 1-17 | Chitosan | 5 | POLYACRYLIC ACID B | 1 | | |
| Sample 1-18 | | | POLYACRYLIC ACID A | 10 | | |

POLYACRYLIC ACID A: product of Toagosei Co., Ltd., MW: 25,000
POLYACRYLIC ACID B: product of Toagosei Co., Ltd., MW: 150,000
PVA 100: "KURARAY POVAL PVA 117", product of Kuraray Co., Ltd. (saponification degree: 98.5%, polymerization degree: 1,700)
PVA 80: "KURARAY POVAL PVA 420", product of Kuraray Co., Ltd. (saponification degree: 79.5%, polymerization degree: 2,000)
Sulfonic group-modified PVA: "GOHSERAN L-3266, product of Nippon Synthetic Chemical Industry Co., Ltd.

TABLE 1-2

|  | Organic acid | | Polyalkylene glycol (polyalkylene oxide) | | Water-based solvent | | |
| --- | --- | --- | --- | --- | --- | --- | --- |
|  | Kind | Parts | Kind | Parts | Kind | Parts | pH |
| Sample 1-1 | | | | | Water | 88 | 2.7 |
| Sample 1-2 | | | | | Water | 85 | 2.9 |
| Sample 1-3 | | | | | Water/IPA = 9/1 | 85 | 2.5 |
| Sample 1-4 | | | | | Water | 70 | 2.6 |
| Sample 1-5 | Sulfamic acid | 3 | | | Water | 82 | 1.7 |
| Sample 1-6 | Maleic acid | 4 | | | Water | 88 | 2.1 |
| Sample 1-7 | BTC | 6 | | | Water | 86 | 2.7 |
| Sample 1-8 | Pyromellitic acid | 5 | | | Water/NMP = 9/1 | 85 | 1.9 |
| Sample 1-9 | BTC | 3 | | | Water | 85 | 2.9 |
| Sample 1-10 | BTC | 2 | | | Water | 84 | 2.7 |
| Sample 1-11 | BTC | 3 | | | Water | 87 | 2.8 |
| Sample 1-12 | BTC | 1 | | | Water | 90.5 | 2.7 |
| Sample 1-13 | BTC | 2 | | | Water | 89 | 2.8 |
| Sample 1-14 | BTC | 1 | | | Water/NMP = 3/7 | 91 | 2.7 |
| Sample 1-15 | BTC | 3 | PEO | 1 | Water | 84 | 2.9 |
| Sample 1-16 | BTC | 3 | PPG | 1 | Water | 84 | 2.9 |
| Sample 1-17 | Acetic acid | 1.5 | | | Water | 92.5 | 4.7 |
| Sample 1-18 | | | | | Water | 90 | 2.8 |

PEO: "PEO-1Z", product of Sumitomo Seika Chemicals Co., Ltd.
PPG: "PREMINOL", product of Asahi Glass Co., Ltd.

Preparation and Evaluation of Conductive Coating Formulations and Conductive Coating Films Example 1

(1) Conductive Coating Formulation

Acetylene black (10 parts) and the aqueous liquid composition of Sample 1-1 (90 parts) were combined, and were then stirred and mixed at a rotational speed of 60 rpm for 120 minutes in a planetary mixer to prepare a conductive coating formulation.

(2) Conductive Coating Film

The prepared conductive coating formulation was applied by a comma roll coater onto one side of a collector formed of an aluminum foil (thickness: 20 μm). The thus-coated collector was then heated and dried for 2 minutes in an oven controlled at 110° C., and was further heated and dried for 2 minutes in the oven controlled at 180° C., so that a conductive coating film of 1 μm thickness was formed on the one side of the collector.

(3) Solubility/Swellability

A solution with 1 mole of $LiPF_6$ dissolved as a supporting salt in a mixed solvent of EC (ethylene carbonate), PC (propylene carbonate) and DME (dimethoxyethane) combined together at 1:1:2 (volume ratio) was prepared. The conditions of the conductive coating film were observed after it was immersed for 72 hours in the solution controlled at 70° C. The conductive coating film was evaluated "good" in solubility/swellability when no changes were observed. On the other hand, the conductive coating film was evaluated "bad" in solubility/swellability when it was peeled or swollen. The results are shown in Table 2.

(4) Surface Resistivity

After the conductive coating formulation was applied onto a PET film by a comma roll coater, the thus-coated PET film was subjected to drying for 5 minutes in an oven controlled at 180° C. to form a conductive coating film (dry thickness: 4 μm). Following JIS K 7194, the surface resistivity of the resultant conductive coating film was measured by the four-point probe method. The results are shown in Table 2. The measurement by the four-point probe method was conducted under the conditions of 25° C. and 60% relative humidity by using a "LORESTA-GP MCP-T610" (manufactured by Mitsubishi Chemical Analytech Co., Ltd.).

Examples 2 to 16, Comparative Examples 1 to 2

Conductive coating films were prepared as in Example 1 described above except that the corresponding aqueous liquid compositions shown in Table 2 were used in place of the aqueous liquid composition of Sample 1-1. The evaluation of solubility/swellability and the measurement of surface conductivity were also conducted as in Example 1. The results are shown in Table 2. It is to be noted that a 5% solution of polyvinylidene fluoride in NMP (PVDF solution) was used in Comparative Example 2.

TABLE 2

| | Aqueous liquid composition | Conductive material Kind | Parts | Solubility/ swellability | Surface resistivity ($\Omega/\square$) |
|---|---|---|---|---|---|
| Ex. 1 | Sample 1-1 | AB | 10 | Good | $2.6 \times 10^3$ |
| Ex. 2 | Sample 1-2 | AB | 7 | Good | $7.2 \times 10^2$ |
| Ex. 3 | Sample 1-3 | AB | 8 | Good | $6.5 \times 10^2$ |
| Ex. 4 | Sample 1-4 | AB | 10 | Good | $1.1 \times 10^3$ |
| Ex. 5 | Sample 1-5 | AB | 13 | Good | $1.3 \times 10^3$ |
| Ex. 6 | Sample 1-6 | AB | 20 | Good | $8.9 \times 10^2$ |
| Ex. 7 | Sample 1-7 | AB | 7 | Good | $5.7 \times 10^2$ |
| Ex. 8 | Sample 1-8 | AB | 5 | Good | $2.2 \times 10^3$ |
| Ex. 9 | Sample 1-9 | AB | 10 | Good | $7.7 \times 10^2$ |
| Ex. 10 | Sample 1-10 | AB | 10 | Good | $9.1 \times 10^2$ |
| Ex. 11 | Sample 1-11 | AB | 10 | Good | $1.0 \times 10^3$ |
| Ex. 12 | Sample 1-12 | KB | 3 | Good | $1.2 \times 10^3$ |
| Ex. 13 | Sample 1-13 | FB | 10 | Good | $1.5 \times 10^3$ |
| Ex. 14 | Sample 1-14 | CNT | 3 | Good | $3.4 \times 10^2$ |
| Ex. 15 | Sample 1-15 | AB | 10 | Good | $1.9 \times 10^3$ |
| Ex. 16 | Sample 1-16 | AB | 10 | Good | $1.1 \times 10^3$ |
| Comp. Ex. 1 | Sample 1-18 | AB | 10 | Bad | $3.6 \times 10^3$ |
| Comp. Ex. 2 | PVDF soln. | AB | 5 | Bad | $1.6 \times 10^3$ |

AB: Acetylene black ("DENKA BLACK HS-100", product of Denki Kagaku Kogyo Kabushiki Kaisha)
KB: Ketjenblack ("ECP600JD", product of Lion Corporation)
FB: Furnace black ("#3050B", product of Mitsubishi Chemical Corporation)
CNT: Carbon nanotubes (multilayer type, diameter: 40 to 60 nm, length: 1 to 2 μm, product of Tokyo Chemical Industry Co., Ltd.)

Application to Cells

Example 17

(1) Positive Electrode Plate

The conductive coating formulation of Example 1 was applied by a comma roll coater onto one side of a collector formed of an aluminum foil (thickness: 20 μm). The thus-coated collector was then heated and dried for 2 minutes in an oven controlled at 110° C., and was further heated and dried for 2 minutes in the oven controlled at 180° C., so that a conductive coating film of 1 μm thickness was formed on the one side of the collector.

A $LiCoO_2$ powder (particle sizes: 1 to 100 μm) (90 parts), acetylene black (5 parts) and a 5% solution of polyvinylidene fluoride in NMP (PVDF solution) (50 parts) were combined, and were then stirred and mixed at a rotational speed of 60 rpm for 120 minutes in a planetary mixer to obtain a slurry-form, positive electrode formulation with the positive-electrode active material contained therein. The thus-obtained, positive electrode formulation was applied onto a surface of the conductive coating film by a comma roll coater, was subjected to drying for 2 minutes in an oven controlled at 110° C., and was dried further for 2 minutes in the oven controlled at 180° C. to eliminate the solvent, so that a positive-electrode active material layer was formed with a dry thickness of 100 μm on the conductive coating film. After pressing was conducted under a condition of 5,000 kgf/cm² to make the film thickness even, aging was conducted for 48 hours in a vacuum oven controlled at 80° C. to fully eliminate volatiles (the water, solvent, etc.) so that a positive electrode plate was obtained.

(2) Negative Electrode Plate

The conductive coating formulation of Example 1 was applied by a comma roll coater onto one side of a copper-foil collector. The thus-coated copper-foil collector was then heated and dried for 2 minutes in an oven controlled at 110° C., and was further heated and dried for 2 minutes in the oven controlled at 180° C., so that a conductive coating film of 1 μm thickness was formed on the one side of the collector.

By combining a carbon powder (90 parts), which had been obtained by thermally decomposing coal coke at 1,200° C., acetylene black (5 parts) and a 5% solution of polyvinylidene fluoride in NMP (PVDF solution) (50 parts) and stirring and mixing the resultant mixture at a rotational speed of 60 rpm for 120 minutes in a planetary mixer, a slurry-form, negative electrode formulation with the negative-electrode active material contained therein was prepared. The thus-obtained negative electrode formulation was applied onto a surface of the conductive coating film layer by a comma roll coater, was subjected to drying for 2 minutes in an oven controlled at 110° C., and was dried further for 2 minutes in the oven controlled at 180° C. to eliminate the solvent, so that a negative-electrode active material layer was formed with a dry thickness of 100 µm on the conductive coating film. After pressing was conducted under a condition of 5,000 kgf/cm² to make the film thickness even, aging was conducted for 48 hours in a vacuum oven controlled at 80° C. to fully eliminate volatiles (the water, solvent, etc.) so that a negative electrode plate was obtained.

(3) Cell

An electrode unit was formed by rolling the positive electrode plate and negative electrode plate into a volute form with a separator interposed therebetween. The separator was made of a porous polyolefin (polypropylene, polyethylene or a copolymer thereof) film having a width broader than the positive electrode plate and a three-dimensional porous (spongy) structure. The thus-formed electrode unit was then inserted into a bottomed cylindrical, stainless steel can, which would also serve as a negative electrode terminal, so that a cell of the AA size and 500 mAh rated capacity was assembled. Charged as an electrolyte into the cell was a solution of 1 mole of $LiPF_6$ as a supporting salt in a mixed solvent prepared by combining EC (ethylene carbonate), PC (propylene carbonate) and DME (dimethoxyethane) at 1:1:2 (volume ratio) to give a total volume of 1 liter.

(4) Charge-Discharge Capacity Retention

The charge-discharge characteristics of cells were measured under a temperature condition of 25° C. by a charge-discharge measuring instrument. Twenty (20) cells were respectively charged at a current value of 0.2 CA charging current, firstly in a charging direction until the cell voltage reached 4.1 V. After a break of 10 minutes, the cells were discharged at the same current until the cell voltage dropped to 2.75 V. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle (hereinafter referred to as "charge-discharge capacity retention") was 98%.

Examples 18 to 21, Comparative Example 3

Cells were fabricated as in Example 17 described above except that the corresponding conductive coating formulations shown in Table 3 were used in place of the conductive coating formulation of Example 1. Further, they were measured for charge-discharge capacity retention as in Example 17. The results are shown in Table 3.

TABLE 3

Positive Electrode Plates, Negative Electrode Plates, and Cells

| | Conductive coating formulation employed for the production of positive electrode plate | Conductive coating formulation employed for the production of negative electrode plate | Charge-discharge capacity retention (%) |
|---|---|---|---|
| Ex. 17 | Conductive coating formulation of Ex. 1 | Conductive coating formulation of Ex. 1 | 98 |
| Ex. 18 | Conductive coating formulation of Ex. 2 | Conductive coating of formulation of Ex. 2 | 99 |
| Ex. 19 | Conductive coating formulation of Ex. 4 | Conductive coating formulation of Ex. 4 | 98 |
| Ex. 20 | Conductive coating formulation of Ex. 9 | Conductive coating formulation of Ex. 9 | 97 |
| Ex. 21 | Conductive coating formulation of Ex. 14 | Conductive coating formulation of Ex. 14 | 96 |
| Comp. Ex. 3 | Conductive coating formulation of Comp. Ex. 2 | Conductive coating formulation of Comp. Ex. 2 | 81 |

Application to Capacitors

Example 22

The conductive coating formulation of Example 1 was applied by a comma roll coater onto one side of a collector formed of an aluminum foil (thickness: 20 µm). The thus-coated collector was then heated and dried for 2 minutes in an oven controlled at 110° C., and was further heated and dried for 2 minutes in the oven controlled at 180° C., so that a conductive coating film of 0.5 µm thickness was formed on the one side of the collector.

A high-purity activated carbon powder (specific surface area: 1,500 m²/g, average particle size: 10 µm) (100 parts) and acetylene black (8 parts) were charged in a planetary mixer, and a 5% solution of polyvinylidene fluoride in NMP (PVDF solution) was added to give a total solids concentration of 45%, followed by mixing for 60 minutes. Subsequently, the mixture was diluted with NMP to a solids concentration of 42%, followed by further mixing for 10 minutes to obtain an electrode formulation. Using a doctor blade, the thus-obtained electrode formulation was applied onto the conductive coating film, followed by drying at 80° C. for 30 minutes in a fan dryer. Using a roll press, pressing was then conducted to obtain a polarizable, capacitor electrode plate having a thickness of 80 µm and a density of 0.6 g/cm³.

From the thus-obtained polarizable, capacitor electrode plate, two discs were cut out with a diameter of 15 mm. Those discs were dried at 200° C. for 20 hours. Those two electrode discs were arranged with their electrode layer sides opposing each other, and a cellulose-made, disc-shaped separator of 18 mm in diameter and 40 µm in thickness was held between the electrode discs. The thus-obtained electrode unit was accommodated in a coin-shaped case made of stainless steel (diameter: 20 mm, height: 1.8 mm, stainless steel thickness: 0.25 mm) and equipped with a polypropylene-made packing. An electrolyte was charged into the coin-shaped case such that no air was allowed to remain. A 0.2-mm thick stainless steel cap was put and fixed on the case with the polypropylene-made packing interposed therebetween. The case was then sealed to produce a capacitor of 20 mm in diameter and about 2 mm in thickness. As the electrolyte, a solution with tetraethylammonium tetrafluoroborate dissolved at a concentration of 1 mole/L in propylene carbonate was employed. The measurement results of capacitance and internal resistance of the thus-obtained capacitor are shown in Table 4.

Examples 23 to 26

As in Example 22 described above except that the corresponding conductive coating formulations shown in Table 4 were used in place of the conductive coating formulation of Example 1, capacitors were obtained. The thus-obtained capacitors were measured for capacitance and internal resistance. The measurement results are shown in Table 4.

Comparative Example 4

As in Example 22 described above except that the corresponding conductive coating formulation shown Table 4 was used in place of the conductive coating formulation of Example 1, a capacitor was obtained. The capacitance and internal resistance of the thus-obtained capacitor were measured, and were used as references for evaluating the capacitors of Examples 22 to 26.

The capacitors were measured at a current density of 20 mA/cm$^2$ for capacitance and internal resistance. Using the capacitance and internal resistance of the capacitor of Comparative Example 4 as references, the capacitors of Examples 22 to 26 were evaluated according to the following standards. The greater the capacitance and the lower the internal resistance, the better the performance as a capacitor.

Evaluation Standards for Capacitance
- A: Capacitance greater by 20% or more than Comparative Example 4.
- B: Capacitance greater by 10% or more but less than 20% than Comparative Example 4.
- C: Capacitance equal to or smaller than Comparative Example 4.

Evaluation Standards for Internal Resistance
- A: Internal resistance lower by 20% or more than Comparative Example 4.
- B: internal resistance lower by 10% or more but less than 20% than Comparative Example 4.
- C: Internal resistance equal to or higher than Comparative Example 4.

TABLE 4

Characteristics of Capacitors

| | Conductive coating formulation employed for the production of polarizable electrode plate | Capacitance | Internal resistance |
|---|---|---|---|
| Ex. 22 | Conductive coating formulation of Ex. 1 | B | B |
| Ex. 23 | Conductive coating formulation of Ex. 3 | B | B |
| Ex. 24 | Conductive coating formulation of Ex. 5 | B | B |
| Ex. 25 | Conductive coating formulation of Ex. 11 | B | A |
| Ex. 26 | Conductive coating formulation of Ex. 12 | B | A |
| Comp. Ex. 4 | Conductive coating formulation of Comp. Ex. 2 | — | — |

Preparation of Hydrophilic Coating Formulations

The formulas of various hydrophilic coating formulations are shown in Tables 5-1 and 5-2. It is to be noted that the following abbreviations will be used: HPC for hydroxypropyl chitosan, HBC for hydroxybutyl chitosan, GLYC for glycerylated chitosan, CMC for carboxymethylated chitosan, SUC for succinylated chitosan, PAA for polyacrylic acid, PMA for polymaleic acid, PVA for polyvinyl alcohol, BTC for 1,2,3,4-butanetetracarboxylic acid, PEG for polyethylene glycol, and PEO for polyethylene oxide.

Example 27

Chitosan (deacetylation degree: 85%, weight average molecular weight: 70,000) (5 parts) was dispersed in deionized water (63.75 parts) to obtain a dispersion. After a 48% aqueous solution of PMA ("Dequest 9000", product of Thermophos International B.V.,) (31.25 parts) was added to the thus-obtained dispersion, the resulting mixture was stirred at room temperature for 4 hours so that a hydrophilic coating formulation (100 parts) was prepared.

Examples 28 to 41

Hydrophilic coating formulations were prepared as in Example 27 described above except that the corresponding formulas shown in Tables 5-1 and 5-2 were employed.

Comparative Example 5

Deionized water (85 parts) and chitosan (deacetylation degree: 85%, weight average molecular weight: 70,000) (10 parts) were combined together. After sulfamic acid (5 parts) was added to the thus-obtained dispersion, the resulting mixture was stirred at room temperature for 4 hours so that a hydrophilic coating formulation (100 parts) was prepared.

Comparative Example 6

After a 10% aqueous solution of PVA ("KURARAY POVAL PVA 117", product of Kuraray Co., Ltd.) (50 parts) was added to deionized water (37.5 parts), an aqueous solution of polyacrylic acid ("JURYMER AC-10L", product of Toagosei Co., Ltd.; solids content: 40%, MW: 25,000) (12.5 parts) was added under stirring. The resulting mixture was stirred at room temperature for 2 hours so that a hydrophilic coating formulation (100 parts) was prepared.

Comparative Example 7

Chitosan (deacetylation degree: 85%, weight average molecular weight: 70,000) (5 parts) was added to deionized water (87.9 parts). To the resulting dispersion, a 50% aqueous solution of lactic acid (4.6 parts) was added, followed by stirring at room temperature for 4 hours. When an aqueous solution of polyacrylic acid ("JURYMERAC-10L", product of Toagosei Co., Ltd.; solids content: 40%, MW: 25,000) (2.5 parts) was added under stirring, a polyion complex of chitosan and the polyacrylic acid precipitated, thereby failing to obtain a coatable homogeneous hydrophilic coating formulation.

TABLE 5-1

Formulas of Various Hydrophilic Coating Formulations

| | Component A | | Component B | | Component C | |
|---|---|---|---|---|---|---|
| | Kind | Parts | Kind | Parts | Kind | Parts |
| Ex. 27 | Chitosan | 5 | PMA | 15 | — | — |
| Ex. 28 | HPC | 5 | PAA | 10 | — | — |
| Ex. 29 | HBC | 5 | PAA | 10 | — | — |

TABLE 5-1-continued

Formulas of Various Hydrophilic Coating Formulations

| | Component A | | Component B | | Component C | |
|---|---|---|---|---|---|---|
| | Kind | Parts | Kind | Parts | Kind | Parts |
| Ex. 30 | GLYC | 5 | PAA | 10 | — | — |
| Ex. 31 | CMC | 5 | PAA | 3 | — | — |
| Ex. 32 | SUC | 5 | PAA | 3 | — | — |
| Ex. 33 | Chitosan | 5 | PAA | 10 | — | — |
| Ex. 34 | Chitosan | 5 | PAA | 5 | PVA | 5 |
| Ex. 35 | Chitosan | 2 | PAA | 10 | PVA | 5 |
| Ex. 36 | Chitosan | 1 | PAA | 5 | PVA | 5 |
| Ex. 37 | Chitosan | 1 | PAA | 5 | PVA | 5 |
| Ex. 38 | Chitosan | 2 | PAA | 5 | PVA | 5 |
| Ex. 39 | Chitosan | 2 | PAA | 5 | PVA | 5 |
| Ex. 40 | HBC | 3 | PAA | 10 | PVA | 4 |
| Ex. 41 | GLYC | 5 | PAA | 15 | PVA | 3 |
| Comp. Ex. 5 | Chitosan | 10 | — | — | — | — |
| Comp. Ex. 6 | — | — | PAA | 5 | PVA | 5 |
| Comp. Ex. 7 | Chitosan | 5 | PAA | 1 | — | — |

PMA: "Dequest 9000", product of Thermophos International B.V.
PAA: "JURYMER AC-10L", product of Toagosei Co., Ltd.
PBTC: "Dequest 7000", product of Thermophos International B.V.
PVA: "KURARAY POVAL PVA 117", product of Kuraray Co., Ltd.
HPC: Hydroxypropyl chitosan
HBC: Hydroxybutyl chitosan
GLYC: Glycerylated chitosan
CMC: Carboxymethylated chitosan
SUC: Succinylated chitosan

TABLE 5-2

Formulas of Various Hydrophilic Coating Formulations

| | Organic acid | | PEO/PEG | | Solvent | | |
|---|---|---|---|---|---|---|---|
| | Kind | Parts | Kind | Parts | Kind | Parts | pH |
| Ex. 27 | — | — | — | — | Water | 80 | 2.5 |
| Ex. 28 | — | — | — | — | Water | 85 | 2.6 |
| Ex. 29 | — | — | — | — | Water | 85 | 2.4 |
| Ex. 30 | — | — | — | — | Water | 85 | 2.5 |
| Ex. 31 | Sulfamic acid | 2 | — | — | Water | 90 | 1.4 |
| Ex. 32 | Sulfamic acid | 2 | — | — | Water | 90 | 1.6 |
| Ex. 33 | Sulfamic acid | 3 | — | — | Water | 82 | 1.8 |
| Ex. 34 | Sulfamic acid | 3 | — | — | Water | 82 | 1.9 |
| Ex. 35 | Sulfamic acid | 2 | — | — | Water | 81 | 1.7 |
| Ex. 36 | BTC | 2 | — | — | Water | 87 | 2.6 |
| Ex. 37 | Maleic acid | 1 | — | — | Water | 88 | 2.2 |
| Ex. 38 | Maleic acid | 2 | PEO | 2 | Water | 84 | 2.1 |
| Ex. 39 | Maleic acid | 2 | PEG | 2 | Water | 84 | 2.1 |
| Ex. 40 | — | — | PEO | 3 | Water | 80 | 2.9 |
| Ex. 41 | — | — | PEO | 2 | Water | 75 | 2.8 |
| Comp. Ex. 5 | Sulfamic acid | 5 | — | — | Water | 85 | 1.8 |
| Comp. Ex. 6 | — | — | — | — | Water | 90 | 2.9 |
| Comp. Ex. 7 | Lactic acid | 2 | — | — | Water | 92 | 4.6 |

BTC: "RICACID BT-W", product of New Japan Chemical Co., Ltd.
PEO: "PEO 1Z", product of Sumitomo Seika Chemicals Co., Ltd.
PEG: "POLYETHYLENE GLYCOL 400", product of Tokyo Chemical Industry Co., Ltd.

Application to Hydrophilization Treatment of Glass Surfaces (1) Formation of Hydrophilic Coating Films Using a bar coater (No. 3), the hydrophilic coating formulations of Examples 27 to 41 and Comparative Examples 5 to 7 were separately applied onto surfaces of 1-mm thick glass plates (100×100 mm) to give a dry film weight of 1 g/m². The glass plates with the hydrophilic coating formulations applied thereon were then heated and dried under the conditions shown in Table 6, so that specimens with hydrophilic coating films of about 0.7 μm formed on the glass plates were obtained.

(2) Washing of Specimens

The specimens were washed for 1 hour with running tap water (flow rate: 1 L/minute), and were then dried at 80° C. for 1 hour in a fan dryer. Using the processing of the washing with running tap water and the drying at 80° C. as 1 cycle, washing was repeated 10 cycles in total.

(3) Measurement of Contact Angle

Purified water (2 μl) was dropped onto each specimen held in a horizontal position. Following JIS K 2396, the contact angle of a water droplet was measured using a contact angle meter ("DropMaster 100", manufactured by Kyowa Interface Science Co., Ltd.). It is to be noted that the measurement of the contact angle was conducted both before washing the specimen and after repeated washing of the specimen over 10 cycles.

(4) Evaluation Standards for Hydrophilicity

From the measured contact angle, the hydrophilicity of the corresponding hydrophilic coating film before and after the washing was evaluated according to the below-described standards. The results are shown in Table 6.

5: Contact angle<10°
4: 10°≤contact angle<20°
3: 20°≤contact angle<30°
2: 30°≤contact angle<40°
1: 40°≤contact angle<50°
0: 50°≤contact angle

TABLE 6

Evaluation Results of Hydrophilicity

| | Heating and drying conditions | | Hydrophilicity | |
|---|---|---|---|---|
| | Drying temp. (° C.) | Time (sec) | Before washing | After washing |
| Ex. 27 | 200 | 60 | 4 | 3 |
| Ex. 28 | 200 | 60 | 4 | 3 |
| Ex. 29 | 200 | 60 | 4 | 3 |
| Ex. 30 | 200 | 60 | 4 | 3 |
| Ex. 31 | 200 | 60 | 3 | 3 |
| Ex. 32 | 200 | 60 | 4 | 3 |
| Ex. 33 | 200 | 60 | 4 | 3 |
| Ex. 34 | 200 | 60 | 4 | 3 |
| Ex. 35 | 200 | 60 | 4 | 3 |
| Ex. 36 | 200 | 60 | 4 | 3 |
| Ex. 37 | 200 | 60 | 4 | 3 |
| Ex. 38 | 200 | 60 | 5 | 4 |
| Ex. 39 | 200 | 60 | 5 | 4 |
| Ex. 40 | 200 | 60 | 5 | 4 |
| Ex. 41 | 200 | 60 | 5 | 3 |
| Comp. Ex. 5 | 200 | 60 | 3 | 0 |
| Comp. Ex. 6 | 200 | 60 | 2 | 0 |
| Comp. Ex. 7 | 200 | 60 | 2 | 1 |

INDUSTRIAL APPLICABILITY

The use of the aqueous liquid composition according to the present invention makes it possible to form a functional coating film, which has excellent adhesiveness to a base material and superb durability, solvent resistance and waterproofness and is capable of exhibiting functions such as electrical conductivity, hydrophilicity, antifouling properties, antimold and antibacterial activities, anti-odor properties and workability. A composite material provided with such a functional coating film is useful, for example, as a collector for an electricity storage device.

LEGEND

10: Collector
12: Conductive coating film

14: Electrode plate member
16: Active material layer
20: Electrode plate

The invention claimed is:

1. An aqueous liquid composition comprising:
a water-based medium containing water;
at least one of chitosan and a chitosan derivative selected from the group consisting of hydroxyalkyl chitosans, carboxyalkyl chitosans, carboxyacyl chitosans, succinyl chitosans, and cationized chitosans; and
a polymeric acid;
wherein the aqueous liquid composition has a pH of not higher than 4.5;
wherein the polymeric acid is at least one polymeric acid selected from the group consisting of polyacrylic acid having molecular weight of 150,000 or less, polymaleic acid, phthalocyanine polycarboxylic acid, phytic acid, hexametaphosphoric acid, polyphosphoric acid, polymethacrylic acid and copolymers thereof, styrene-maleic acid copolymer, isobutylene-maleic acid copolymer, vinyl ether-maleic acid copolymer, pectic acid, polyglutamic acid, polymalic acid, polyaspartic acid, and acrylic acid-maleic acid-vinyl alcohol copolymer;
wherein a content of the at least one of chitosan and chitosan derivative in the aqueous liquid composition is 0.1 to 40 parts by mass per 100 parts by mass of the aqueous liquid composition; and
wherein a content of the polymeric acid in the aqueous liquid composition is 1 to 40 parts by mass per 100 parts by mass of the aqueous liquid compostion.

2. The aqueous liquid composition according to claim 1, further comprising at least one resin selected from the group consisting of unmodified polyvinyl alcohol, modified polyvinyl alcohols, unmodified ethylene-vinyl alcohol copolymer, and modified ethylene-vinyl alcohol copolymers.

3. The aqueous liquid composition according to claim 2, wherein the modified polyvinyl alcohol is at least one modified polyvinyl alcohol selected from the group consisting of carboxyl-modified polyvinyl alcohols, carbonyl-modified polyvinyl alcohols, silanol-modified polyvinyl alcohols, amino-modified polyvinyl alcohols, cation-modified polyvinyl alcohols, sulfonic group-modified polyvinyl alcohols, and acetoacetyl-modified polyvinyl alcohols.

4. The aqueous liquid composition according to claim 1, further comprising an organic acid with a proviso that the organic acid is other than phosphonobutane tricarboxylic acid.

5. The aqueous liquid composition according to claim 1, further comprising at least one of a polyalkylene glycol and a polyalkylene oxide.

6. The aqueous liquid composition according to claim 1, wherein the chitosan derivative is at least one chitosan derivative selected from the group consisting of hydroxyalkyl chitosans, carboxyalkyl chitosans, and carboxyacyl chitosans.

7. The aqueous liquid composition according to claim 1, wherein the polymeric acid is at least one polymeric acid selected from the group consisting of polyacrylic acid having a molecular weight of 150,000 or less, and polymaleic acid.

8. The aqueous liquid composition according to claim 1, further comprising a conductive material.

9. The aqueous liquid composition according to claim 8, wherein the conductive material comprises at least one conductive material selected from the group consisting of acetylene black, Ketjenblack, graphite, furnace black, monolayer and multilayer carbon nanofibers, and monolayer and multilayer carbon nanotubes.

10. An aqueous coating formulation comprising the aqueous liquid composition according to claim 1.

11. A functional coating film formed with the aqueous coating formulation according to claim 10.

12. The functional coating film according to claim 11, which has a surface resistivity of not higher than 3,000Ω/□ as measured following JIS K 7194.

13. A method for forming a functional coating film, comprising a step of heating the aqueous coating formulation according to claim 10 to at least 80° C.

14. A composite material provided with a base material and the functional coating film according to claim 11 arranged integrally on the base material.

15. The composite material according to claim 14, wherein the base material is at least one base material selected from metals, glass, natural resins, synthetic resins, ceramics, wood, paper, fibers, non-woven fabrics, woven fabrics, and leather.

16. The composite material according to claim 14, wherein the base material comprises at least one base material selected from the group consisting of aluminum, copper, nickel, and stainless steel.

17. An electrode plate member provided with a collector and a conductive coating film arranged on a surface of the collector, wherein the conductive coating film has been formed by subjecting, to heat treatment, the aqueous liquid composition according to claim 8 coated on the surface of the collector.

18. The electrode plate member according to claim 17, wherein the collector is a collector for a nonaqueous electrolyte secondary cell, electric double-layer capacitor or lithium ion capacitor.

19. An electrode plate provided with the electrode plate member according to claim 17 and an active material layer arranged on a surface of the conductive coating film.

20. An electricity storage device provided with the electrode plate according to claim 19.

21. The electricity storage device according to claim 20, which is a nonaqueous electrolyte secondary cell, electric double-layer capacitor or lithium ion capacitor.

* * * * *